US011851223B2

(12) United States Patent
Knops et al.

(10) Patent No.: US 11,851,223 B2
(45) Date of Patent: Dec. 26, 2023

(54) METHOD AND DEVICE FOR THE FORMATION OF STACKS OF PACKAGINGS

(71) Applicant: TEEPACK SPEZIALMASCHINEN GMBH & CO. KG, Meerbusch (DE)

(72) Inventors: Hans Knops, Krefeld (DE); Stefan Lambertz, Hürth (DE)

(73) Assignee: Teepack Spezialmaschinen GmbH & Co. KG, Meerbusch (DE)

( * ) Notice: Subject to any disclaimer, the term of this patent is extended or adjusted under 35 U.S.C. 154(b) by 0 days.

(21) Appl. No.: 17/674,105

(22) Filed: Feb. 17, 2022

(65) Prior Publication Data
US 2022/0258895 A1 Aug. 18, 2022

(30) Foreign Application Priority Data
Feb. 18, 2021 (EP) ...................................... 21157908

(51) Int. Cl.
*B65B 35/50* (2006.01)
*B65B 5/06* (2006.01)
(Continued)

(52) U.S. Cl.
CPC .............. *B65B 35/50* (2013.01); *B65B 5/061* (2013.01); *B65B 5/10* (2013.01); *B65G 57/08* (2013.01)

(58) Field of Classification Search
CPC ........... B65B 5/061; B65B 5/10; B65B 35/20; B65B 35/205; B65B 35/24; B65B 35/40;
(Continued)

(56) References Cited

U.S. PATENT DOCUMENTS

| 2,941,676 A * | 6/1960 | Harker .................... B65B 35/50 |
| | | 53/542 |
| 3,019,886 A * | 2/1962 | Winkler et al. ......... B65B 27/08 |
| | | 53/542 |

(Continued)

FOREIGN PATENT DOCUMENTS

| DE | 3715191 A1 * | 6/1988 |
| DE | 4017692 A1 | 12/1991 |

(Continued)

OTHER PUBLICATIONS

Extended European Search Report dated Aug. 4, 2022 in connection with European patent application 22167608.3, 15 pages including English translation.
(Continued)

*Primary Examiner* — Stephen F. Gerrity
(74) *Attorney, Agent, or Firm* — Dorsey & Whitney LLP (57) ABSTRACT

The present invention relates to a method for the formation of stacks of packagings (152) by stacking infusion bags (140), in which the infusion bags (140) are removed from a conveying stretch (100) on which the infusion bags (140) provided one behind the other are supplied to a removal station (102) in which the infusion bags (140) are removed from the conveying stretch (100) and are arranged resting against one another to form the stack of packagings (100) in a stack holding device (122; 300) which is emptied when a number of infusion bags (140) forming the stack of packagings (152) has been reached, where the removal of the infusion bags (140) from the conveying stretch (100) is not interrupted when the stack holding device (122; 300) is being emptied and at least one infusion bag (140) removed there is arranged upstream of the stack holding device (122; 300).

13 Claims, 6 Drawing Sheets

(51) Int. Cl.
 *B65B 5/10* (2006.01)
 *B65G 57/08* (2006.01)
(58) Field of Classification Search
 CPC ....... B65B 35/405; B65B 35/44; B65B 35/50; B65B 35/56; B65G 47/082; B65G 47/252; B65G 47/82; B65G 57/08; B65G 57/11; B65G 57/14; B65G 57/32; B65H 31/06
 USPC ........... 53/446, 447, 540, 542, 544; 271/181
 See application file for complete search history.

(56) References Cited

U.S. PATENT DOCUMENTS

| | | | | |
|---|---|---|---|---|
| 3,866,905 | A * | 2/1975 | Trogan et al. | B65H 31/30 271/181 |
| 4,176,993 | A * | 12/1979 | Luginbuhl | B65G 57/32 53/542 |
| 4,524,566 | A * | 6/1985 | Hauers et al. | B65B 5/101 53/542 |
| 4,712,356 | A * | 12/1987 | Hardage et al. | B65B 23/12 53/542 |
| 4,921,398 | A * | 5/1990 | Fluck | B65G 57/28 53/542 |
| 4,940,223 | A * | 7/1990 | Weigel et al. | B65H 31/06 271/181 |
| 5,495,932 | A * | 3/1996 | Dyess | B65G 47/252 198/416 |
| 5,524,876 | A * | 6/1996 | Porter | B65H 31/06 271/178 |
| 5,548,945 | A * | 8/1996 | Nippes | B65B 5/061 53/542 |
| 5,941,365 | A | 8/1999 | Ritter | |
| 7,470,102 | B2 * | 12/2008 | Gendron et al. | B65H 31/06 271/187 |
| 2009/0277133 | A1 | 11/2009 | Yokota et al. | |
| 2014/0193100 | A1 | 7/2014 | Sigrist | |
| 2019/0023441 | A1 | 1/2019 | Boger et al. | |

FOREIGN PATENT DOCUMENTS

| | | | |
|---|---|---|---|
| DE | 4244089 A1 * | 6/1994 | ............. B65B 35/50 |
| DE | 29600871 U1 | 3/1996 | |
| DE | 29600871 U1 * | 4/1996 | ............. B65B 5/061 |
| DE | 102006032919 A1 | 12/2007 | |
| DE | 102015115732 A1 | 3/2016 | |
| EP | 2812250 B1 | 8/2016 | |
| EP | 3431400 A1 | 1/2019 | |
| JP | H02127224 A | 5/1990 | |
| JP | 2002240932 A | 8/2002 | |
| JP | 2020152388 A | 9/2020 | |
| WO | 9221597 A1 | 12/1992 | |
| WO | 2013026173 A2 | 2/2013 | |

OTHER PUBLICATIONS

European Search Report issued in European Patent Application No. 21157908.1 dated Jul. 30, 2021, 13 pages including English translation.

* cited by examiner

METHOD AND DEVICE FOR THE FORMATION OF STACKS OF PACKAGINGS

CROSS REFERENCE TO RELATED APPLICATIONS

This application claims benefit of priority pursuant to 35 U.S.C. § 119(a) of European patent application no. EP21157908.1 filed Feb. 18, 2021, which is hereby incorporated herein by reference in its entirety.

Method and Device for the Formation of Stacks of Packagings

The present invention relates to a method for the formation of stacks of packagings by stacking infusion bags.

A method from EP 2 812 250 B1 is known. In this previously known method, individual infusion bags are removed from a conveying stretch that interacts with a circulating conveyor belt which feeds the individual previously produced infusion bags from a bag production device to a stacking station in which the bags are stacked to form a stack of packagings. The aforementioned prior art has a feed stretch that is formed by two conveyor belts extending in parallel that clamp the respective infusion bags between them and that removes the individual infusion bags from a conveying stretch and feeds them to an introduction station in which several infusion bags are stacked to form a stack of packagings. A pivotable arm is provided for this purpose and removes the individual infusion bags from the feed stretch at a right angle to the direction of motion of the conveyor belts and feeds them to a stack holding device that holds the stack of infusion bags with a stacking axis that corresponds to the horizontal direction.

An alternative solution is known from DE 10 2015 115 732 A1. In this prior art, infusion bags are separated on a horizontally extending production stretch by cutting a bag material that forms the wrapping of the infusible material. Immediately downstream of the respective cutting device, the individual infusion bags drop into a receptacle mounted to be rotatable. From there, the individual bag is pressed out by a punch into a stack holding device which is arranged below the receptacle and in which the bags are deposited on top of one another with a stacking axis in the vertical direction. The receptacle has wedge surfaces with which the ejected infusion bag is centered within the receptacle. Slides are provided below the receptacle and close the underside of the receptacle in order to prevent the infusion bags from accidentally dropping out of the receptacle and are opened synchronously with the advancing punch.

In this prior art, the receptacle also serves as a buffer store for ejected infusion bags in the event that the stack holding device is not provided below the receptacle and the stack of packagings stacked there removed from the stack holding device. In this case, the slides are moved together and close the lower opening of the receptacle.

The previously known solutions leave something to be desired.

The present invention is based on the object of specifying a device for the formation of stacks of packagings containing infusion bags which is compact in structure and allows simple and reliable stacking of infusion bags. The method is to enable stacks of packagings to be formed quickly by stacking infusion bags and is accordingly to be able to be carried out economically and in a space-saving manner.

The method is based on EP 2 812 250 B1 as being generic. In the method according to the invention, the infusion bag is arranged in a stack holding device in the context of the removal motion from the conveying stretch for the formation of the stack of packagings. Accordingly, the infusion bag is transferred directly from the conveying stretch to the stack holding device. The conveying stretch is the section that discharges the finished infusion bag from the bag production device and feeds it directly to a removal station in which the infusion bag is removed from the conveying stretch. The removal is there performed by a removal device which acts upon the infusion bag in order to introduce it into the stack holding device. The removal device can there also cause the bags to be stacked in the stack holding device.

Like in the case of the solutions known from prior art, the stack holding device is movable for transferring it from the introduction station to a discharge station in which the stack of packagings is removed from the stack holding device. The stack of packagings consists of a predetermined number of infusion bags. The stacks of packagings produced consecutively each consist of an identical number of infusion bags.

In the solution according to the invention, the removal device can be provided with a counter and a sensor that is data-connected to a control device for the removal device in order to only activate the removal device when a receptacle space on the conveying stretch is in fact occupied by a finished infusion bag. The signal of the sensor and/or the actuation of the removal device can serve as a counter for those infusion bags entry into a machine control which, when the number of infusion bags has been reached, transfers the stack holding device from the introduction station to the discharge station.

In the method according to the invention, the finished bag is in any case fed from the bag production device causing this directly via the one conveying stretch to the removal station where the infusion bag is removed from the conveying stretch. The removal is performed in a predetermined controlled manner by the removal device. Moving the bag directly into the stack holding device during in the framework of the removal motion shortens the motion paths. The infusion bag is there handled only once after being removed from the conveying stretch for transferring it to the stack holding device.

The method according to the present invention then proves to be time-saving and space-saving. Compared to prior art, fewer system components are required to form a stack of packagings.

Compared to prior art according to DE 10 2015 115 732 A1, having the infusion bags drop into a receptacle under gravity is dispensed with. The method according to the invention is typically carried out such that the bags are aligned with their main direction of extension in the vertical direction. The bags are accordingly preferably standing in the stack holding device. The stacking axis of the infusion bags provided one behind the other then preferably extends in the horizontal direction. The infusion bags are accordingly pushed into the stack holding device in a horizontal motion.

The device according to the invention, which is also based on EP 2 812 250 B1 as generic prior art, however, is characterized by a removal device that is configured to be adapted to move the infusion bag from the conveying stretch to the stack holding device.

The buffer store can have a buffering capacity of between one and four, preferably three, infusion bags. The at least one infusion bag in the buffer store is preferably arranged in an orientation which corresponds to the orientation of the infusion bag in the stack of packagings. This orientation is preferably a vertical orientation in which the surfaces of the infusion bag having the largest area extend substantially in the vertical direction. The infusion bag is accordingly standing on an edge. The largest surface of the bag accordingly serves as a contact surface for the infusion bags resting against one another in the stack holding device.

According to a preferred embodiment of the method according to the invention, the infusion bag disposed on the conveying stretch is deflected downwardly by way of a deflection wheel from a substantially horizontal orientation to a substantially vertical orientation. The centrifugal force generated as part of this deflection is used to separate the infusion bag from the conveying stretch using a horizontal speed component. The conveying stretch can additionally be further deflected beyond the vertical direction by way of the deflection wheel so that this also creates an additional spacing between the conveying stretch and the infusion bag in the framework of the separation of the infusion bag and the conveying stretch. The conveying stretch is formed by a circulating belt on which the infusion bag rests. Due to the horizontal speed component, the infusion bag is moved in the direction toward the stack holding device. In this way, part of the kinematic energy of the infusion bag is used to transfer the infusion bag in the framework of the removal from the conveying stretch in the direction toward the stack holding device.

In the context thereof, the infusion bag is removed from the conveying stretch in a preferably continuous motion and fed to the stack holding device. The latter is typically disposed tangentially to the conveying stretch. The stacking direction determined by the stack holding device accordingly extends approximately orthogonally to the conveying stretch. The stacking direction is the direction in which the respective infusion bags are placed against each other in the stack holding device. The stacking direction corresponds to the direction of longitudinal extension of the stack holding device, in particular the direction of longitudinal extension of a slot for stacking the individual infusion bags.

A continuous motion in the sense of this further development is understood to mean, in particular, a motion of the infusion bag that takes place without interruption so that the infusion bag remains in motion from when it is removed from the conveying stretch until it is introduced into the stack holding device. A typically horizontal motion of the mass point of the infusion bag is there continuously deflected to a primarily vertical motion, so that the bags are stacked in a vertical direction. During this continuous motion, the infusion bag preferably maintains its orientation.

In at least one example of the present disclosure, a device includes a buffer store in which the at least one infusion bag is held being clamped. The clamping there is typically passive clamping. For this purpose, a clamping device is provided in which the oppositely disposed clamping surfaces have a spacing which is less than the associated dimension of the infusion bag. The respective dimension is typically the height and/or the width of the infusion bag. The infusion bag is then held clamped in the clamping device in a vertical orientation. The clamping surfaces are preferably formed by ribs which extend in the direction of introduction, i.e substantially in the horizontal direction and which are disposed opposite one another. The ribs are preferably made of a plastic material, in particular hard plastic material or metal, so that the respective infusion bag can slide past the ribs with little friction when the infusion bags—as is the rule—are moved by the removal device from the conveying stretch directly into the stack holding device.

The ribs are typically formed to be curved, where the front end of the ribs first contacting the infusion bag has a stronger vertical orientation than a rear region of the ribs so that the infusion bag is given a stronger horizontal direction of motion when sliding past the ribs and guided by the ribs. According to a preferred further development, the device according to the invention has a bag guide. This bag guide is configured to be adapted to force an increasingly horizontal motion component upon a substantially vertically moved infusion bag which is standing upright.

The respective bag guide is disposed between the conveying stretch and the stack holding device. The bag guide can also form the clamping device at the same time. The bag guide can form or comprise the ribs discussed above. Bags that are directly transferred from the conveying stretch to the stack holding device are then transferred by the bag guide to a horizontal motion in which the bags are stacked one behind the other within the stack holding device. If, however, the stack holding device is emptied, the clamping of the respective infusion bags in the clamping device arises. In this specific configuration, the bag guide is then also provided within the buffer store.

The ribs can preferably be provided with notches. The notches typically extend in the vertical direction. At least one notch for each bag is provided on opposite sides for each rib. Occasionally, several notches on one side of an infusion bag provided in the buffer store can be associated with the latter. If the infusion bag is configured as a double-chamber bag, then one, in which the edge of the respective chamber can each be received, notch is preferably provided on oppositely disposed sides for each chamber. In any case, the infusion bags are also buffered in the buffer store in a positive-fit manner due to the notches.

In the method according to the invention, the infusion bags are removed from the conveying stretch in a substantially vertical orientation, preferably ejected upstream of the buffer store. As a result, the infusion bags move in the direction toward the buffer store with a vertical speed component that is predetermined based on the inertia of the infusion bags and the respective kinematic parameter by the conveying stretch and/or the force of gravity. As worked out above, the infusion bag can have a vertical and a horizontal speed component when it is separated from the conveying stretch, where the horizontal speed component is certainly also caused by the kinematic parameters of the conveying stretch. In addition, a guide can also be provided which forces an increasingly horizontal motion upon the infusion bag when it is separated from the conveying stretch and moved in the direction toward the stack holding device. The dropping distance is typically limited laterally and also to the underside. The ejection is performed such that each infusion bag assumes substantially that orientation in the gravitational field of the earth that the infusion bag also has in the stack of packagings.

The arrangement of the infusion bag upstream of the buffer store is to be understood to mean that the infusion bag is located in the stacking direction upstream of the buffer store. The stacking direction extends preferably in the horizontal direction.

According to a preferred further development of the present invention, the infusion bag performing the dropping motion is carried along by a stack punch. The approximately vertical trajectory of the infusion bag is changed by a horizontal component that is imposed by the stack punch and by which the infusion bag is approached closer to the inlet of the buffer store.

For this purpose, the conveying stretch formed by a conveyor belt is deflected immediately upstream of the removal station so that the conveyor belt from an orientation extending substantially horizontally is deflected downwardly beyond the vertical direction. The conveyor belt is preferably defined on the outer side by a deflection hood so that the individual infusion bags also remain in the respective compartment of the conveyor belt in the region of the deflection. The compartment is preferably formed between two webs of the conveyor belt which can each accommodate an infusion bag between themselves and project from the conveyor belt.

As a result of the deflection of the conveyor belt, the bags are separated downstream of the folding from the conveyor belt into a receptacle which is configured to be adapted to receive the infusion bag. This receptacle is located between the buffer store and the stack punch which is part of the removal device and which can be moved alternately all the way into the buffer store and typically therebeyond all the way into the stack holding device. The stack punch preferably comprises two stacking flanges which receive the conveyor belt between themselves and are movable in the direction toward the buffer store while carrying along the infusion bag.

In view of reliably holding the individual infusion bags stacked in the stack holding device, the latter comprises a stack housing on which pawls are mounted to be pivotable. The respective pawls are attached opposite one another to be pivotable relative to one another. The corresponding pawls form a stop for a leading infusion bag which is held in a stacking slot. This stacking slot forms the receptacle for the stacked infusion bags. The stacking slot is formed by and surrounded by the stack housing. The stacking slot is provided with at least one stop on the underside in the introduction station which prevents individual infusion bags from slipping through during the stacking process. The respective stop is located in the introduction station in the base of the stack housing. However, this base can also be penetrated by a discharge device that in the discharge station engages in the stack housing, typically after the stack holding device has been pivoted by 90° about a pivot axis that extends in the horizontal direction, so that an opening pointing upwardly in the introduction station comes down, through which the stack of packagings is discharged from the stack holding device as a whole, for example, directly into a cardboard packaging which receives the stack of packagings.

Further details and advantages of the present invention shall become apparent from the following description of an embodiment in combination with the drawing, in which.

Figure 1:
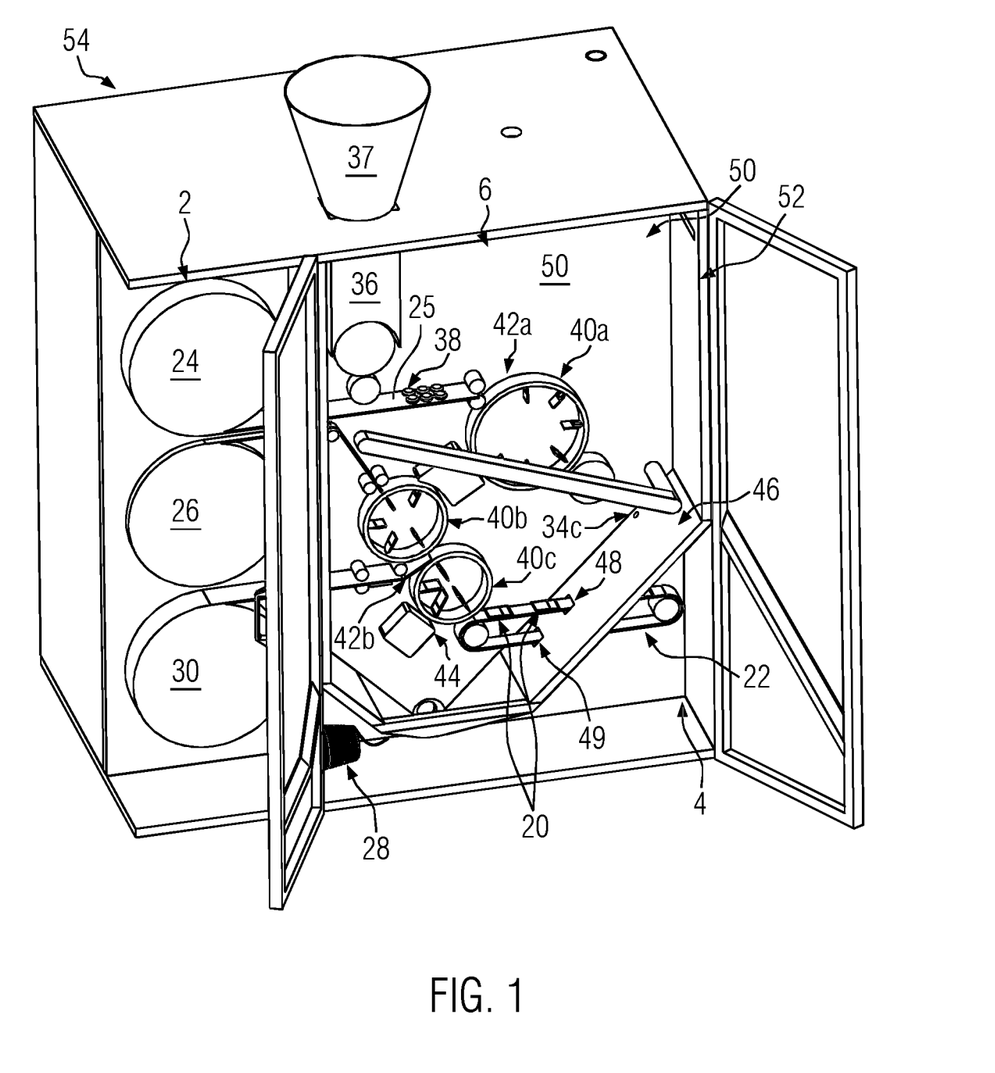
FIG. 1 shows a slightly perspective top view of an operating side of an embodiment of a bag production device.

FIG. 1 shows the top view onto an embodiment of a device for the production of bags filled with infusible material which has substantially three areas, namely a storage area 2 on the left-hand edge, a product area 4 on the right-hand edge, and a work area 6 between the storage area 2 and the product area 4.

Figure 4:
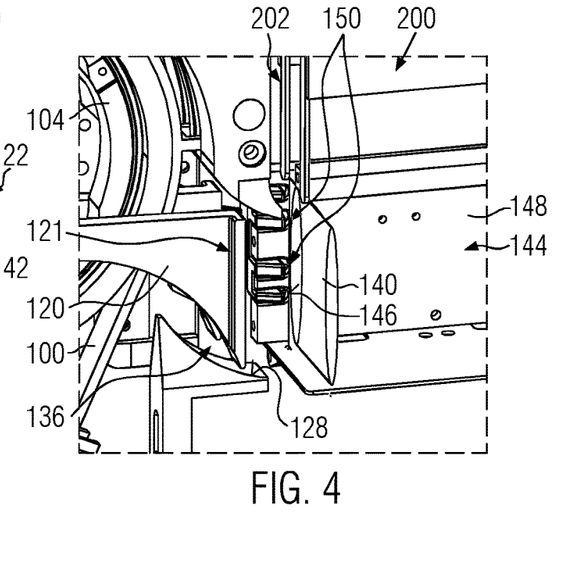
FIG. 4 shows the detail according to FIG. 3 in a perspective side view.

The bags are produced by removing consumable material from the storage area 2 which is processed to form bags in the work area 6. An example of such a bag is shown in FIG. 4. There, the bag is denoted by reference character 8. Reference character 10 denotes a label which is connected to the bag 8 by way of a thread 12. The entity of bag 8, label 10, and thread 12 is received in an aroma packaging 14 which is formed by film material that is impermeable to moisture and that is placed around the bag 8 at an edge 16 and is closed by a U-shaped weld seam 18.

Figure 2:
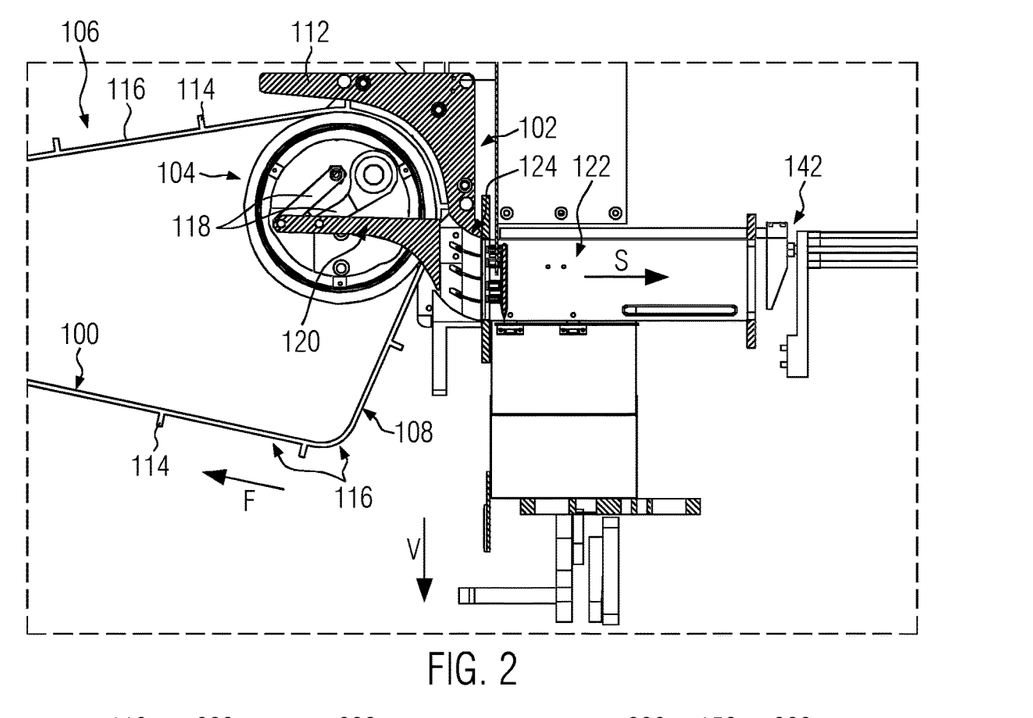
FIG. 2 shows a side view of a removal station for infusion bags which have been produced in the bag production device according to FIG. 1.
Figure 8:
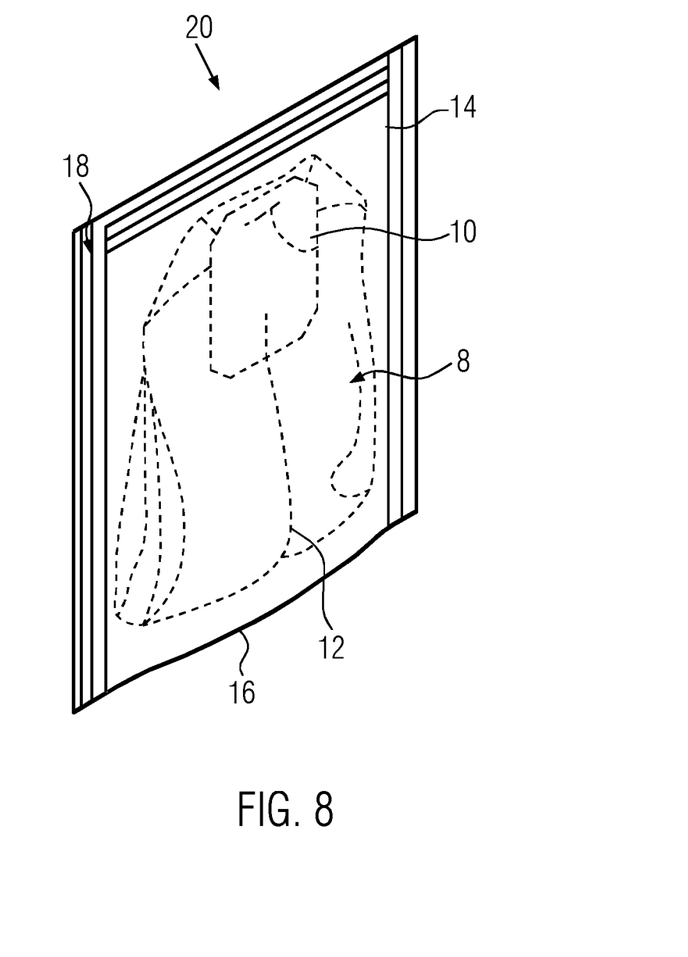

The product shown in FIG. 8 is referred to below as a finished infusion bag 20. The finished infusion bag 20 is moved from the work area 6 to the product area 4 by way of a conveying stretch 22 in the form of a schematically illustrated conveyor belt, details of which can be gathered from FIGS. 2ff. A removal station according to FIGS. 2ff, not shown in FIG. 1, is disposed at the end of this conveying stretch 22 which is denoted by reference character 100 in FIGS. 2ff.

A supply 24 for bag material 25, a supply 26 for the labels 10, a supply 28 for the thread 12, and a supply 30 for the aroma packaging 14 which are used as consumable materials in the production of the finished infusion bags 20 can be seen in the storage area 2. These respective consumable materials are each provided on a roll and are rolled off therefrom in the course of production.

The storage area 2 has guides for the individual webs of consumable material. The consumable material is passed through a first partition wall 32 between the storage area 2 and the work area 6. This partition wall 32 comprises various openings, denoted by reference character 34, for the passage of the respective consumable material. The dimensions of the respective opening 34 are selected such that the respective consumable material can barely be passed through the first partition wall 32. Each opening 34 can be associated with an air curtain through which an undesired passage of air from the work area 6 into the storage area 2 or the product area 4 can be prevented. In the embodiment shown, the partition wall 32 defining the work area 6 on the left-hand side comprises an opening 34a for the bag material 25, an opening 34b for the labels 10, and an opening 34d for the aroma packaging 14.

In the work area 6, a batch of the infusible material is placed on the bag material 25 at the height of a portioning device 36 with a supply 37 for infusible material. The bag material 25 is guided on a horizontal stretch 38. After the batch has been placed onto the bag material 25, the latter is shaped into a tube containing the batch. The bag material 25 supplied as endless material is cut into length sections and thus separated. At the end of the horizontal stretch 38, the length sections of the bag material 25 prepared in this manner are transferred to a first transport wheel 40a.

At the height of an introduction station 42a, the bag material 25 is moved radially inwardly in the direction of the central longitudinal axis or the axis of rotation of the first transport wheel 40a in order to form the bag 8 configured as a double-chamber bag. The first transport wheel 40a rotates clockwise and feeds the respective bag material 25 to different stations in which the bag is closed at the top and connected to the thread 12 and the label 10.

The bag 8 thus created and processed at the top is transferred from the first transport wheel 40a to a second transport wheel 40b rotating in the counterclockwise direction, where the bag 8 is pivoted between the two transport wheels 40a, 40b such that the bottom of the bag 8 is introduced first in the radial direction into the second transport wheel 40b. The bag 8 is there connected to the label 10 and is rotated within the second transport wheel 40b such that the bottom of the bag 8, which is oriented radially inwardly when introduced, is oriented radially outwardly. In this orientation, i.e. pivoted by 180° relative to the direction of introduction, the bag 8 thus prepared is conveyed out of the second transport wheel 40b with the bottom facing forward and fed to a third transport wheel 40c. The bag is fed to a wrapping station 42b in which the aroma packaging 14 is placed around the bag 8 as well as the label 10 and the thread 12 when the edge 16 is formed. The aroma packaging 14 is then sealed in a sealing station 44 for forming the U-shaped seam 18. The sealing station 44 is associated with a third transport wheel 40c on which the bag 8 is held and transported during the sealing process.

The finished bag 20 thus produced is finally placed on the conveying stretch 22 and fed to the product area 4. For this purpose, a second partition wall 46 comprises a bag passage opening 48 and a return opening 49 for the conveying stretch 22.

The components previously described as part of the work area 6 are disposed in front of a base plate 50 which carries the individual components and, possibly, separates them from drives that are provided on the oppositely disposed side of the base plate 50. The region of the base plate 50 facing the user separates an operating side 52 provided there from a drive side 54 on the rear side of the device.

FIG. 2 shows parts of the conveyor belt which forms the transport section 22 according to FIG. 1 and is denoted by reference character 100 in FIGS. 2ff and which connects a bag production device, denoted by reference character 101 in FIG. 1, to a removal station 102. In the removal station 102, the conveyor belt 100 is deflected by way of a deflection wheel 104 so that a section of the conveyor belt 100, denoted by reference character 106 and extending substantially horizontally, is deflected in the vertical direction. The deflected section 106 provided in the conveying direction downstream of the deflection wheel 104 is deflected beyond the vertical direction, which is denoted by reference character 110. The conveyor belt 100 is surrounded on the outer circumference by a deflection hood 112 which between itself and the deflection wheel 104 forms a gap into which the conveyor belt 100 and the webs 114 that project therefrom can move and that form between them a compartment 116 for receiving the finished infusion bag denoted by reference character 140 in FIGS. 2 to 7. The gap is sized such that the infusion bags cannot be hurled out of their respective compartment 116 when the conveyor belt 100 is deflected. The gap extends approximately vertically at an end which in the conveying direction F is at the rear.

Figure 3:
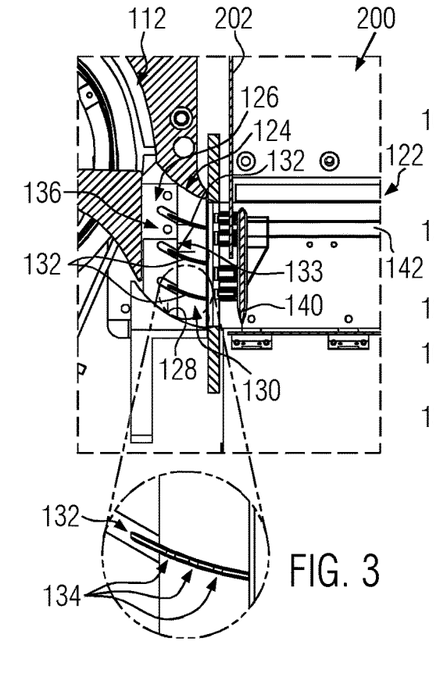
FIG. 3 shows a detail according to FIG. 2 in an enlarged illustration with an enlarged detail of the ribs.

Two pivot arms 118 basically extending in parallel can be seen in FIG. 2 within the deflection wheel 104 and carry a stack punch 120 which is movable cyclically to and fro and substantially in the horizontal direction by pivoting the pivot arms 118 and presently forms an example of a removal device 121. FIGS. 2 and 3 there show an initial position in which the stack punch 120 is moved away to the maximum to the left-hand side, i.e. away from a stack holding device 122.

A buffer store 124 is provided in the direction of introduction upstream of the stack holding device 122. A receptacle 126 configured to be adapted to receive an infusion bag is formed between the buffer store 124 and the deflection wheel 104. This receptacle 126 is defined on the underside by a receptacle base 128 which is configured in the shape of a ramp and inclines towards the stack holding device 122. In the embodiment shown, the receptacle base 128 is provided in a cross-sectional view with a concave surface in a plane containing the direction of motion of the stack punch 120.

The buffer store 124 has two oppositely disposed wall segments 130, of which the wall segment in the drawing being the one in front has been removed in FIGS. 2 and 3. The buffer store 124 is typically formed by a rectangular frame-shaped component. The oppositely disposed and vertically extending inner surfaces of the wall segments 130 comprise several ribs 132 which project inwardly from the respective wall segments 130. As illustrated in FIG. 3, the several ribs 132 are provided in an arrangement parallel to one another. The ribs 132 are each inclined downwardly in the direction toward the stack holding device 122. The ribs 132 extend in a curved manner. A front end of the ribs 132 facing the receptacle 126 has a greater vertical orientation than a rear end facing the stack holding device 122. The corresponding ribs 132 then form an embodiment of a bag guide 133 within the meaning of the present invention. The greater vertical orientation of the front end of the ribs 132 clamps the infusion bag 140 ejected from the conveyor belt 100 when the infusion bag is moved downwardly with a predominantly vertical speed component after the infusion bag 140 has passed the deflection wheel 104. As a result of the centrifugal force, the infusion bag 140 then also has a certain horizontal motion component. The inclination of the ribs 132 at their front end is configured to be adapted to the resulting motion of the infusion bag 140. This is also influenced by the stack punch 120 which bears within the receptacle 126 against a main side surface of the infusion bag 140 in order to push the latter horizontally in the direction toward the stack holding device 122.

For buffering several infusion bags 140 one behind the other between the ribs 132, the latter have several notches 134, each provided one behind the other in the longitudinal direction of the ribs 132 and extending in the vertical direction (cf. FIG. 4). The concavely curved receptacle base 128 can also be regarded to be part of said bag guide 133. However, the bag can also be transferred into the stack holding device 122 without touching the receptacle base 128.

The oppositely disposed wall segments 130 with the associated ribs 132 form a clamping device 136 within the receptacle 126 for infusion bags standing upright. A single infusion bag 140 can there be clamped and held also in a positive-fit manner in each one of the notches 134 of the oppositely disposed ribs 132. In FIGS. 3 and 4, such a finished infusion bag 140 can be seen standing upright and already received in the stack holding device 122. This infusion bag 140 is held in its upright orientation in the stack holding device 122 by a holding punch 142 which is movable in the stacking direction S in a stacking slot 144. The holding punch 142 can be, for example, a pneumatically pretensioned punch which retracts passively with the number of infusion bags 140 stacked in the stacking slot 144. On the oppositely disposed side, the infusion bag 140 of the stack, which was introduced last into the stacking slot 144 and is the leading one, bears against a stop 146. This stop 146 has stop surfaces distributed over the entire height of the infusion bag 140 and is formed by a pawl 150 mounted to be pivotable on a stack housing 148. The surfaces of the segments of the pawl 150 that each form the stop 146 are configured to taper conically towards forwardly, defining the end inlet to the stacking slot 144. This results in a funnelshaped constriction, the clear width of which is greater on the inlet side than immediately adjacent to the stops 146.

In order to stack the previously produced infusion bags 140, the latter are released vertically downwardly in the respective compartments 116 at the end of the deflection hood 116 with products supplied while the conveyor belt 100 rotates continuously. Since the conveyor belt 100 is deflected all the way behind the vertical direction V, the conveyor belt 100 and also the webs 114 are disposed behind the vertical direction V in the region of the receptacle 126.

The stack punch 120 is synchronized with the conveyor belt 100 and, accordingly, with the ejection of the individual infusion bags 140 such that the stack punch 120 moves into the receptacle 126 in the context of the flight motion of the infusion bags 140 and thereby carries along the infusion bag 140. The infusion bag 140, which drops freely in the vertical direction, accordingly experiences a horizontal speed component from the stack punch 120. In the context of this feed motion, the infusion bag 140 is forced in the direction toward the stack holding device 122 between the oppositely disposed ribs 132 of the buffer store 144 and is clamped there. In the typical course of the method, the stack punch 142 is pivoted all the way into the stack holding device 122. Oppositely disposed side edges of the infusion bag 144 there press the pawls 150 apart. If the infusion bag 140 has passed the pawls 150, then the motion of the stack punch 120 is reversed. After the pawls 150 have sprung back, the stack punch 142 forces the infusion bag 140, which was introduced last and which is accordingly held in its upright position in the stacking slot 144, against the stop 146 (cf. FIGS. 3, 4).

Once the number of infusion bags 140 forming a stack of packagings 152 has been introduced in this manner into the stacking slot 144, then the latter is emptied, which shall be described in detail hereafter.

However, the rotational motion of the conveyor belt 100 is also maintained when the stack holding device 122 is being emptied. Infusion bags 140 continue to be ejected from the conveyor belt 140 into the receptacle 126. In the process, the stack punch 120 performs only a reduced horizontal motion, in the course of which the respective infusion bag 140 is introduced into the buffer store 144. The infusion bag 140 is buffered there in a position standing upright between the ribs 132 and in particular in a positive-fit manner also by introducing the oppositely disposed edges of the infusion bag 140 into the notches 134.

In the embodiment shown, the stack punch 122 is actuated only when the respective compartment 116 is in fact filled with an infusion bag 140. The actuation of the stack punch 120 then also serves to count the infusion bags respectively inserted in the direction towards the stack holding device 122.

Figure 5A:
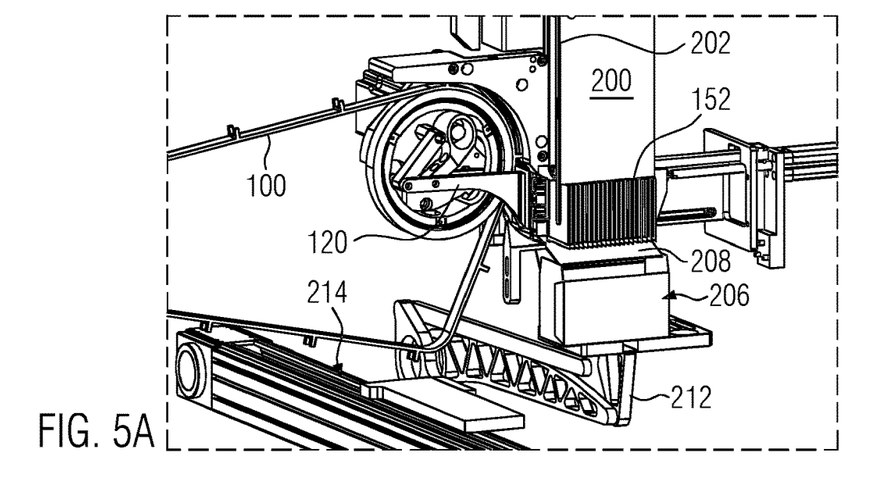
FIGS. 5A-5C show a perspective side view for a first embodiment of a stack holding device when being emptied.
Figure 5B:
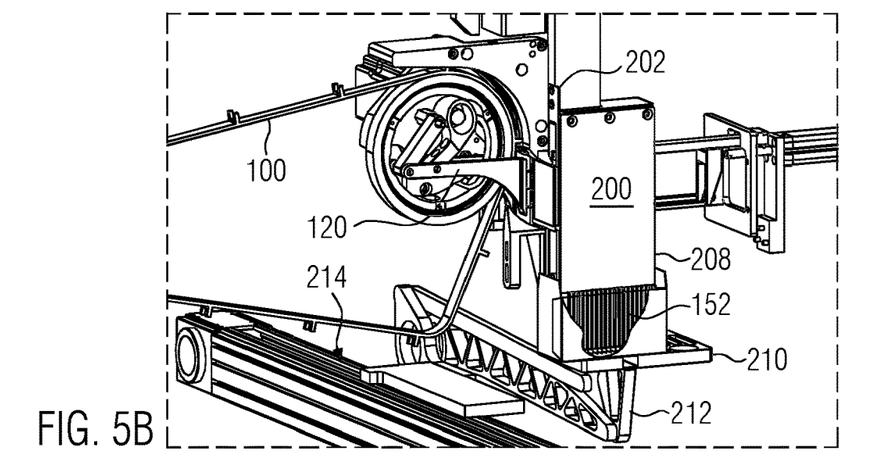
Figure 5C:
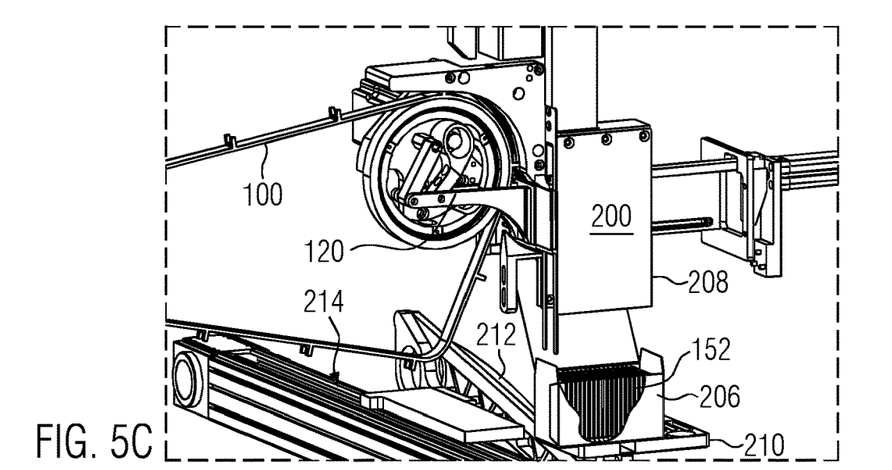

Emptying the stack holding device according to the embodiment shown above shall be explained hereafter with reference to FIGS. 5A to 5C.

In the embodiment according to FIGS. 5A to 5C, the stack holding device 122 is emptied without change of position. For this purpose, a pusher 200 is provided which is firmly connected to a guide fork 202 and is movable vertically. When the number of infusion bags 140 forming the stack of packagings 152 has been reached, the pusher 200 is moved downwardly. The guide fork 202 is guided in a leading manner between the buffer store 124 and the stacking slot 144, namely immediately adjacent to the stops 146 and therefore to the infusion bag 140 which in the stacking direction S is the leading one. The guide fork 202 is inserted into a cardboard packaging 206 (cf. FIG. 5B). In the context of the lowering motion of the pusher 200, a bottom flap 208 defining the stacking slot 144 on the underside is pivoted downwardly and in the direction toward the cardboard packaging 206 into the latter. The cardboard packaging 206, shown partially removed in FIGS. 5b and 5c, is held by way of a holding plate 210 which is movable vertically on a pivot arm 212. This pivot arm 212 is held in a translationally movable manner on a rail 214.

The pusher 200 moving down pushes the stack of packagings 152 into the cardboard packaging 206. With an increasing lowering motion of the pusher 200, the holding plate 210 is lowered together with the cardboard packaging 206. Once the stack of packagings 152 has been completely received in the cardboard packaging 206, a motion of the pusher 200 and the holding plate 210 in the opposite direction arises.

During this emptying of the stacking slot 144, the guide fork 202 also closes the buffer store 420 at the same time. The stack punch 120 is moved continuously onward while the punch holding device 122 is being emptied. Up to three infusion bags 140 are stored into the buffer store in the context of the emptying process. When the fourth infusion bag 140 is pushed out in the direction toward the buffer store 124, the emptying process of the stack holding device 122 has already been completed. The guide fork 202 has released the passage into the stacking slot 144. The bottom flap 208 is closed again so that the fourth infusion bag is pressed into the stacking slot 144 by appropriate control of the stack punch 120 and forces the three infusion bags previously held in the buffer store 124 advancing them into the stacking slot 144.

Meanwhile, the holding plate 210 with the filled cardboard packaging 206 can be moved in a translational manner along the rail 214 and pushed at a different position for further processing off the holding plate 210 which then supports the production of a new cardboard packaging 206 and moves it under the stacking slot 144 in a subsequent cycle.

Figure 6A:
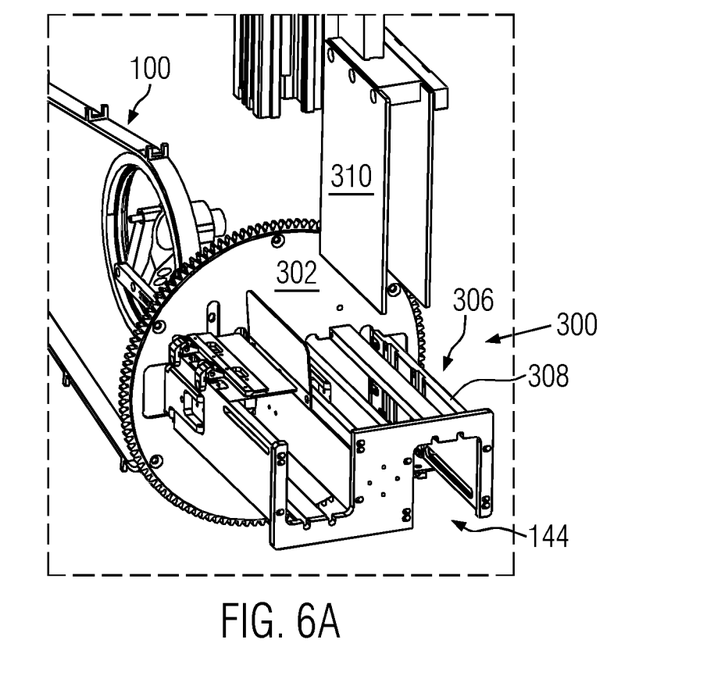
FIGS. 6a/b show a perspective side view of a second embodiment of a stack holding device.
Figure 6B:
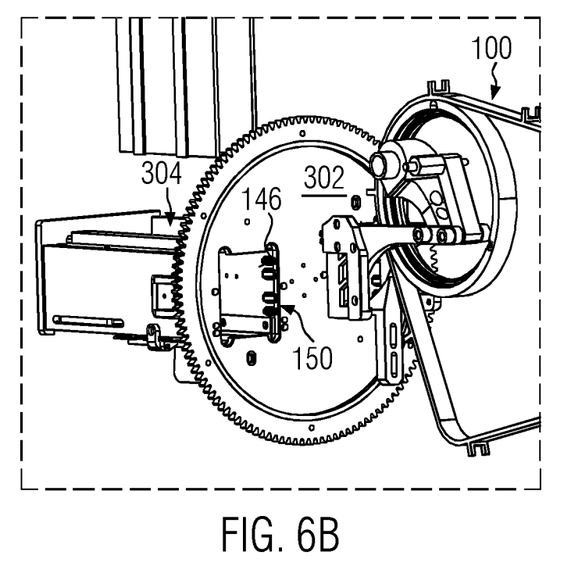

An alternative stack holding device 122 is shown in FIGS. 6 *a* and *b* and denoted there by reference character 300. This stack holding device 300 has two disks 302, of which only a single disk 302 is shown in FIGS. 6a/6b, which each receive and hold two stacking slots 144 between them. The stack holding device 300 thus formed is mounted to be pivotably or rotatable about a horizontal axis which intersects the center point of the two disks 302. The stack holding device can then be pivoted from an introduction station 304 of the respective stacking slot 144 to a discharge station 306 in which the respective stacking slot 144 is emptied. It goes without saying that the stacking slot 144 in the discharge station 306 is oriented with its opening downward. The stacking slot 144 shown at the front in FIG. 6 reveals a slotted base 308 which is configured to be adapted for the introduction of the pusher 310 into the stacking slot 144. The pusher 310 can then convey the stack of packagings 152 downwardly out of the stacking slot 144 into a cardboard packaging 206 (not shown in FIGS. 6a and 6b) and thus empty the stack holding device 122 at the discharge station 306.

Further details of the device for moving the stack of packagings into a cardboard packaging can be gathered from FIGS. 7A to 7D. A holding plate on which a cardboard packaging 314 can be supported is denoted there by reference character 312. This holding plate 314 is mounted to be pivotable on a pivot arm 316 which is provided as an extension of the stack holding device 300. A slide 318 is associated with the pivot arm 316 and pushes the cardboard packaging filled with the stack of packagings 152 from the holding plate 312 onto a transport section for further processing of the cardboard packaging 314.

Figure 7A:
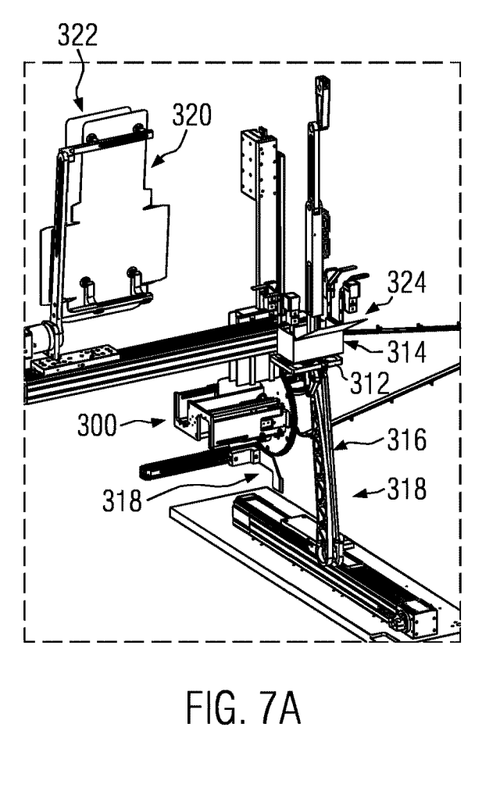
FIGS. 7A-7C show the stack holding device shown in FIG. 6 in operation with a device for the formation of a cardboard packaging and FIG. 8 shows a perspective view of a bag produced in the device according to FIGS. 1 to 7C.

A blank feed is denoted by reference character 320 and holds a plurality of blanks 322 for the production of the cardboard packagings 314. The blanks 322 are fed via the blank feed 320 to a folding station 324 with a shaping punch 326. On the way there, the blanks 322 are provided with adhesive—where necessary. The shaping punch 326 moves downwardly in the drop station 324. Folding surfaces there become effective which form from the initially flat blank 322 a cardboard packaging 314 which is placed on the holding plate 312 (FIG. 7A).

Figure 7B:
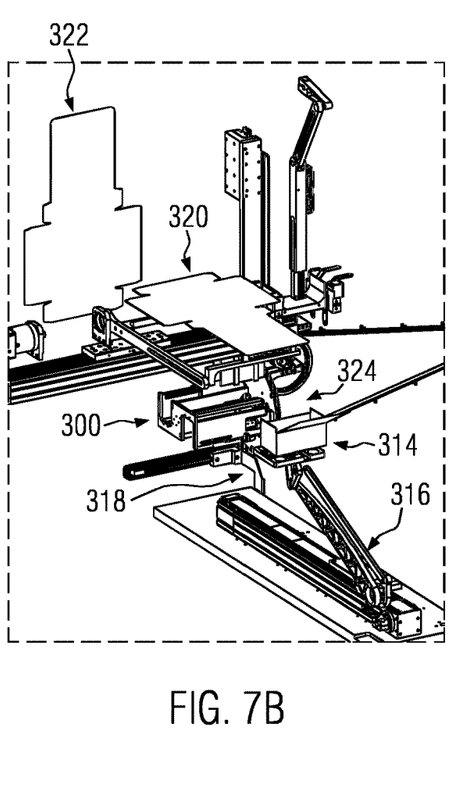

In the meantime, the stack holding device 300 rotates to move the stacking slot 144 filled with the stack of packagings 152 into the discharge station 306 (cf. FIG. 7B).

Figure 7C:
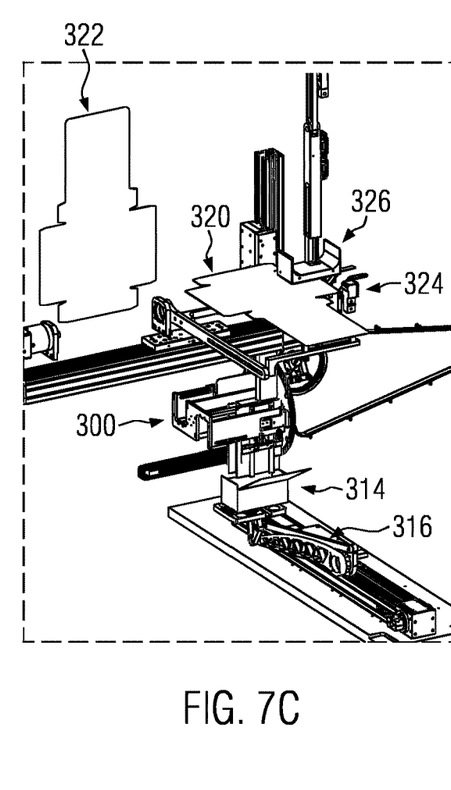

Once the holding plate 312 with the cardboard packaging 314 has been arranged below the stacking slot 144, the pusher 310 moves down and forces the stack of packagings 152—as already described above—into the cardboard packaging 314 provided therebelow. In this example as well, the cardboard packaging 314 is lowered while being filled with the stack of packagings 152. The cardboard packaging 314 filled with the stack of packagings 152 is pushed off the holding plate 312 by the slide 318.

LIST OF REFERENCE CHARACTERS 2 storage area
4 product area
6 work area
8 bag
10 label
12 thread
14 aroma packaging
16 edge
18 sealing seam
20 finished infusion bag
22 conveying stretch
24 supply for bag material
25 bag material
26 supply for labels 10
28 supply for thread 12
30 supply for aroma packaging 14
32 first partition wall
34a opening for bag material
34b opening for labels
34c opening for thread
34d opening for aroma packaging
36 portioning device
37 supply for infusible material
38 horizontal stretch
40a first transport wheel
40b second transport wheel
40c third transport wheel
42a introduction station
42b wrapping station
44 sealing station
46 second partition wall
48 bag passage opening
49 return opening
50 base plate
52 operating side
54 drive side
56 protective door
58 panel
60 hopper
62 suction opening
64 blower
66 blow arm
67 blow nozzles
68 work space
70 cover
72 suction opening
74 ventilation device
76 separator
78 quick release fastener
80 reservoir
100 conveyor belt
101 bag production device
102 removal station
104 deflection wheel
106 horizontal section
108 deflected section
112 deflection hood
114 web
116 compartment
118 pivot arm
120 stack punch
121 removal device
122 stack holding device
124 buffer store
126 receptacle
128 receptacle base
130 wall segment
132 rib
133 bag guide
134 notch
136 clamping device
140 infusion bag
142 holding punch
144 stacking slot
146 stop
148 stack housing
150 pawl
152 stack of packagings
200 pusher
202 guide fork
206 cardboard packaging
208 bottom flap
210 holding plate
212 pivot arm
214 rail
300 stack holding device
302 disk
304 introduction station
306 discharge station
308 base
310 pusher
312 holding plate
314 cardboard packaging
316 pivot arm
318 slide
320 blank feed
322 blank
324 drop station
326 shaping punch
F conveying direction
S stacking direction
V vertical direction

The invention claimed is:

1. A method for the formation of stacks of packagings by stacking infusion bags, in which said infusion bags are removed from a circulating conveyor belt on which said infusion bags provided one behind the other are supplied to a removal station in which said infusion bags are removed from said conveyor belt and are arranged resting against one another to form said stack of packagings in a stack holding device which is emptied when a number of infusion bags forming said stack of packagings has been reached, wherein the removal of said infusion bags from said conveyor belt is not interrupted when said stack holding device is being emptied and at least one infusion bag removed there is arranged upstream of said stack holding device and wherein said infusion bag disposed on said conveyor belt is deflected downwardly by way of a deflection wheel from a substantially horizontal orientation to a substantially vertical orientation and is separated as a result of the centrifugal force with a horizontal speed component from said conveyor belt and moved in the direction toward said stack holding device.

2. The method according to claim 1, wherein said infusion bag disposed on said conveyor belt is introduced into said stack holding device in a vertical orientation and with a continuous motion from said conveyor belt which is guided substantially tangentially past said stack holding device.

3. The method according to claim 2, wherein said at least one of said infusion bags is held upstream of said stack holding device by being clamped in a vertical orientation in a clamping device, which clamping device for clamping acts upon oppositely disposed edges of said infusion bag.

4. The method according to claim 1, wherein said at least one infusion bag removed from said conveyor belt when said stack holding device is being emptied is arranged upstream of said stack holding device in an orientation that corresponds to the orientation of said infusion bag in said stack of packagings, where said infusion bag is configured to stand upright in said orientation, and that said at least one infusion bag upstream of said stack holding device, after said stack holding device has been emptied, is pushed into said stack holding device by an infusion bag removed from said conveyor belt and transferred directly into said stack holding device.

5. The method according to claim 1, wherein said at least one of said infusion bags upstream of said stack holding device is held clamped in a vertical orientation in a clamping device acting upon oppositely disposed edges of said infusion bag.

6. The method according to claim 1, wherein said infusion bag is removed in a substantially vertical orientation from said conveyor belt in the stacking direction (S), and wherein said infusion bag is configured to be ejected upstream of the buffer store.

7. The method according to claim 6, wherein said infusion bag is carried along by a stack punch in a direction substantially in said stacking direction (S).

8. A device for the formation of stacks of packagings by stacking infusion bags with a conveyor belt on which infusion bags are conveyed from a bag production device to a removal station, a removal device associated with said removal stations and a stack holding device, where said removal device is configured to be adapted to move said infusion bags from said conveyor belt to a stack holding device disposed in an introduction station and with a buffer store which is disposed upstream of said stack holding device disposed in said introduction station and is configured to be adapted to buffer at least one infusion bag wherein said buffer store comprises a clamping device acting upon oppositely disposed edges of said infusion bag.

9. The device according to claim 8, further comprising an infusion bag guide which is provided between said conveyor belt and said stack holding device and forces an increasingly horizontal motion component upon an infusion bag standing upright and moved substantially vertically.

10. The device according to claim 8, wherein said clamping device comprises oppositely disposed ribs which act upon said oppositely disposed edges of said infusion bag while deforming said infusion bag.

11. The device according to claim 10, wherein said ribs are provided with notches.

12. The device according to claim 8, wherein said stack holding device comprises oppositely disposed pawls on the inlet side which are attached to be pivotable to a stack housing forming a stacking slot and which form a stop for a leading infusion bag held in said stacking slot.

13. The device according to claim 8, wherein said conveyor belt immediately upstream of said removal station is deflected downwardly from an orientation extending substantially horizontally beyond the vertical direction, and that a receptacle adapted to receive an infusion bag is formed below the deflection of said conveyor belt and is provided between said buffer store and a stack punch which is movable alternately through said buffer store.

* * * * *